March 6, 1951     S. W. STORTZ     2,544,056
FLUID PRESSURE CONTROL VALVE
Filed July 14, 1947     2 Sheets—Sheet 1

INVENTOR
STEPHEN W. STORTZ

BY *Young Whight*

ATTORNEYS

March 6, 1951  S. W. STORTZ  2,544,056
FLUID PRESSURE CONTROL VALVE

Filed July 14, 1947  2 Sheets-Sheet 2

INVENTOR
STEPHEN W. STORTZ

BY

ATTORNEYS

Patented Mar. 6, 1951

2,544,056

UNITED STATES PATENT OFFICE 2,544,056

FLUID PRESSURE CONTROL VALVE

Stephen W. Stortz, Fort Atkinson, Wis.

Application July 14, 1947, Serial No. 760,806

1 Claim. (Cl. 137—104)

This invention appertains to valves and more particularly to a novel float valve for controlling the height of liquid in a receptacle or tank.

One of the primary objects of my invention is to provide a novel valve structure, which is extremely sensitive to pressure changes, whereby the same can be quickly opened and closed.

Another salient object of my invention is to provide a valve in which the pressure on the opposite sides thereof is substantially equal or balanced so that the easy and quick operation thereof by the float is assured.

A further object of my invention is to provide a novel valve structure in which the valve disc or body can be quickly and conveniently renewed when worn.

A still further object of my invention is to provide a novel float valve of the above character which will be simple and easy to manufacture and one which can be placed upon the market at a reasonable cost.

A still further important object of my invention is to provide a float valve for controlling the height of liquid and the supply of liquid to any tank or receptacle, but which is particularly useful for controlling the flow of water to a drinking trough or fountain.

With these and other objects in view the invention consists in the novel construction, arrangement, and formation of parts, as will be hereinafter more specifically described, claimed, and illustrated in the accompanying drawings.

Figure 1:
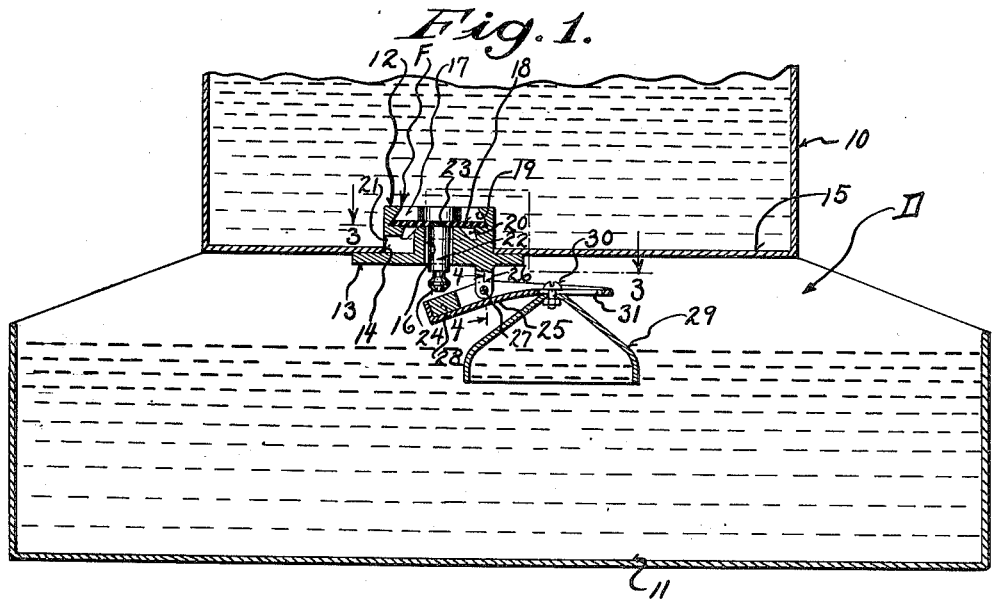
Figure 1 is a vertical sectional view showing my novel float valve incorporated with a drinking fountain for livestock and poultry, the section being taken substantially on the line 1—1 of Figure 3 looking in the direction of the arrows.

Referring to the drawings in detail, wherein similar reference characters designate corresponding parts throughout the several views the letter F generally indicates my novel float valve. As brought out in the objects of the specification, the float valve is adapted for controlling the flow of liquid to and the height of water in any desired tank or receptacle. In the drawings, however, for the purpose of illustrating one use of my novel float valve I have shown the same incorporated with a drinking fountain D for livestock and poultry.

The drinking fountain D can be of any preferred character and, as illustrated, includes a reservoir or tank 10 and a drinking trough 11. The tank or reservoir 10 can be located above and centrally of the trough 11. My valve controls the flow of water from the reservoir or tank 10 to the trough 11.

The float valve F includes a valve casing 12 having an outstanding annular bottom flange 13. The casing 12 can be inserted through an opening 14 in the bottom wall 15 of the tank or reservoir 10 and the flange 13 is fitted snug against the bottom face of said wall 15. The flange is secured to the wall in any desired way. The valve casing 12 is provided with a central passageway 16 which opens out through the lower end of the casing. The upper end of the passageway opens into a chamber 17 formed in the upper end of the valve casing. A flexible valve disc 18 is sprung into the chamber into contact with the upper end of the passageway 16. The inner surface of the chamber 17 is undercut as of 19 for the purpose of retaining the valve disc 18 in place. It is to be noted that the valve casing is provided with an annular groove 20 at the bottom of the chamber 17 and that this groove surrounds the passageway 16 and functions to form a valve seat at the upper end of the passageway 16. One or more inlet ports 21 are formed in the valve casing 12 and these ports open out through the valve casing and communicate with the annular groove 20.

At this point, attention is directed to the fact that the pressure of the liquid in the tank or reservoir 10 holds the valve disc 18 tight down on its seat so as to cover the passageway 16. However, the liquid entering port 21 and filling the annular groove 20 also creates a pressure on the underside of the valve disc 18. Consequently, the pressures on the opposite sides of the valve disc are substantially equal or balanced. This permits the quick and easy operation of the valve disc. However, the greater pressure is on the upper surface of the disc to hold the valve normally closed.

Extending axially through the passageway 16 is the valve stem 22, and this stem is connected in any desired way with the valve disc 18, as at 23. The lower end of the valve stem 22 extends below the valve casing 12 and can be provided with a depending head 24.

Rockably mounted on the valve casing is a float lever 25. While the float lever can be formed in any desired way, the same is adapted to be stamped from sheet metal to reduce expense. The lever can be of a substantially U-shape in cross section, and the side walls of the lever receive the pivot ears 26 which are formed on the valve casing at one side of the central passageway 16. A pivot pin 27 connects the pivot ears to the lever. The forward end of the lever is provided with a bumper pad 28 for engaging the head 24 of the valve stem 22. The opposite end of the lever has connected thereto any desired type of float, and I prefer to use a float 29 of the bell type. This is permitted in view of the sensitivity of the valve. The upper end of the float 29 carries a headed fastening element 30, and the lever 25 can be provided with a longitudinal slot 31 for receiving this fastening element. Consequently, the float can be adjusted longitudinally of the lever to govern the opening and closing of the valve and to control the height of the water in the trough.

Figures 2, 3:
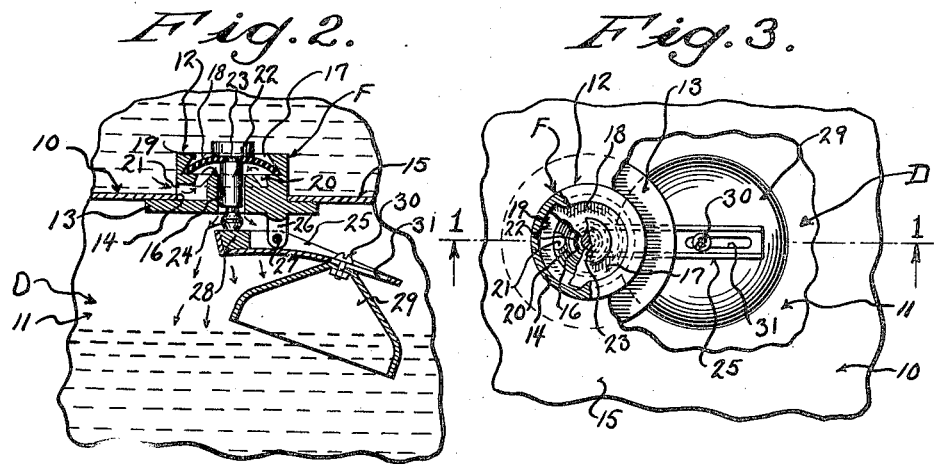
Figure 2 is a view similar to Figure 1, but showing the valve disc moved off of its seat by the weight of the float for supplying water to the trough.
Figure 3 is a fragmentary detailed horizontal view taken on the line 3—3 of Figure 1 looking in the direction of the arrows.
Figure 4:
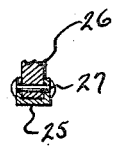
Figure 4 is a detailed vertical sectional view taken on the line 4—4 of Figure 1 looking in the direction of the arrows and illustrating the means for pivotally connecting the float lever to the valve casing.
Figure 5:
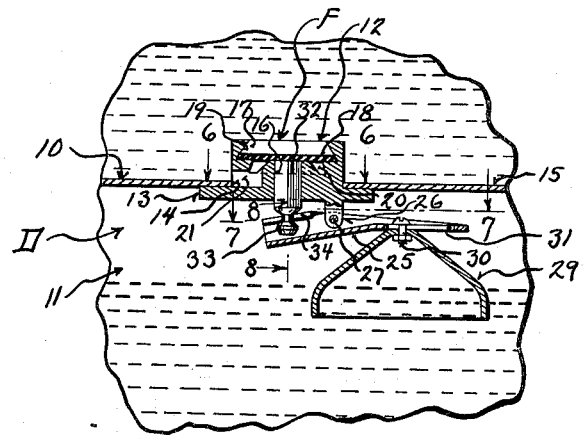
Figure 5 is a fragmentary vertical sectional view similar to Figure 1, but illustrating a slightly modified form of my invention.
Figure 6:
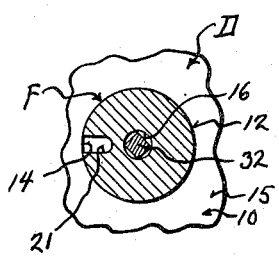
Figure 6 is a horizontal sectional view through the valve casing and valve stem, the section being taken on the lines 6—6 of Figure 5 looking in the direction of the arrows.
Figure 7:
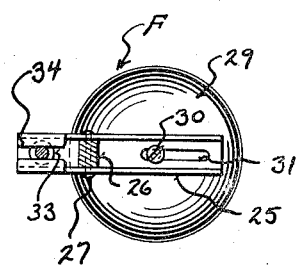
Figure 7 is a detailed sectional view taken on the lines 7—7 of Figure 5 looking in the direction of the arrows, the view showing the float lever and the bell float in top plan.
Figure 8:
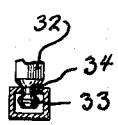
Figure 8 is a detailed vertical sectional view taken on the line 8—8 of Figure 5 looking in the direction of the arrows, illustrating the sliding connection between the float lever and the valve stem.

In operation, the reservoir tank 10 is supplied with water in any preferred way and the pressure of the water acting on the upper face of the valve disc 18 will hold the disc on its seat. When the water in the trough 11 falls below a certain level, see Figure 2, the float will drop down and raise the inner end of the lever against the head 24. This will push up on the stem 22 and raise the central portion of the valve disc off of its seat. This will allow the flow of water from the reservoir through the port 21 and groove 20 through the passageway 16 into the trough. When the water rises in the trough to a certain distance the float 29 will be raised and the inner end of lever will be moved away from the head 24 of the valve stem 22, and the pressure of the water in the reservoir will force the valve back on its seat.

My float valve can be modified without departing from the spirit or the scope of my invention, and in Figures 5 to 8 I have shown one modification. In the valve shown in Figures 1 to 4 the valve stem 22 was of a cylindrical shape and of a less diameter than the passageway 16. In the modified form of my invention I utilize a valve stem 32 which is of a polygonal shape in cross section, and the edges of the stem engage the wall of the passageway 16 (see Figure 6). Consequently, the stem is guided in the passageway and water can flow between the stem and the wall of the passageway. Likewise, in the modified form the stem 32 merely presses against the lower face of the valve disc 18. The lower end of the stem 32 is provided with a depending head 33 and this head is slidably received between inturned flanges 34 on the side walls of the float lever 25. The modified form of my invention functions identically the same as that form of my invention shown in Figures 1 to 4 inclusive.

It is understood that the valve can be used on water pipes and lines and effectively work with water pressure.

From the foregoing description it can be seen that I have provided an exceptionally simple and durable type of float valve in which pressures on opposite sides of the valve disc are substantially balanced to permit the quick opening and closing thereof. The entire construction is such that a compact device is had and as the chamber 17 is open the upper face of the valve disc 18 is exposed to the action of the water in the tank. Hence the valve disc can be easily cleaned and can be quickly pulled out for replacement.

Other changes in details can be made without departing from the spirit or the scope of the claim.

I claim:

In a float valve for controlling the flow of liquid from a source of supply to a receptacle, a valve casing having a chamber in its upper end, and an axially disposed passageway communicating with the chamber and opening out through the lower end of the casing, said chamber being open at its upper end to the source of supply of the liquid, the wall of the chamber being undercut, a flexible valve disc sprung in the undercut portion of the chamber through the open upper end of the chamber over the passageway and being normally held against the wall of the passageway by fluid, said casing also having an annular groove therein below the chamber and valve disc and a port communicating with the groove and a source of liquid supplied, whereby to create a pressure under said valve disc.

STEPHEN W. STORTZ.

REFERENCES CITED

The following references are of record in the file of this patent:

UNITED STATES PATENTS

| Number | Name | Date |
| --- | --- | --- |
| 551,577 | Chamberlain | Dec. 17, 1895 |
| 907,458 | Cavanaugh | Dec. 22, 1908 |
| 1,118,649 | Halter | Nov. 24, 1914 |
| 1,426,093 | Owens | Aug. 15, 1922 |
| 1,928,103 | Hill | Sept. 26, 1933 |
| 2,016,997 | Hartke | Oct. 8, 1935 |

FOREIGN PATENTS

| Number | Country | Date |
| --- | --- | --- |
| 2,650 | Great Britain | Dec. 16, 1854 |
| 72,575 | Sweden | Sept. 1, 1931 |